United States Patent
Benefiel et al.

[15] 3,639,147
[45] Feb. 1, 1972

[54] ARTICLE HAVING MULTILAYER COATING AND PROCESS FOR PRODUCING SAME

[72] Inventors: James William Benefiel, Livonia; Anthony William Opipari, Sterling Heights, both of Mich.

[73] Assignee: Celanese Coatings Company, New York, N.Y.

[22] Filed: Feb. 3, 1970

[21] Appl. No.: 8,389

Related U.S. Application Data

[62] Continuation-in-part of Ser. No. 763,972, Sept. 30, 1968, abandoned.

[52] U.S. Cl. ..........................117/73, 117/71 R, 117/71 M, 117/72, 117/74, 117/75, 117/87, 117/89

[51] Int. Cl. ....................................B44d 1/14, B32b 15/08

[58] Field of Search ....................................117/73, 74, 72, 75

[56] References Cited

UNITED STATES PATENTS

| | | | |
|---|---|---|---|
| 2,860,110 | 11/1958 | Godshalk | 270/17 |
| 3,025,181 | 3/1962 | Nuessle et al. | 117/73 X |
| 2,141,789 | 7/1964 | McConeghey | 117/73 |
| 3,197,325 | 7/1965 | Hick et al. | 117/73 |
| 3,210,210 | 10/1965 | Ball et al. | 117/73 X |
| 3,276,905 | 10/1966 | Porter | 117/73 X |

*Primary Examiner*—William D. Martin
*Assistant Examiner*—Ralph Husack
*Attorney*—Thomas J. Morgan, L. I. Grim and H. P. Price

[57] ABSTRACT

Product and process for producing a multilayer coating composition by depositing a nonaqueous, pigmented, cellulose ester containing polymeric base film on a substrate and before baking, depositing (wet-on-wet) a transparent polymeric topcoat composition on the base film and baking the resulting multilayer system.

15 Claims, No Drawings

ARTICLE HAVING MULTILAYER COATING AND PROCESS FOR PRODUCING SAME

CROSS-REFERENCE TO RELATED APPLICATION

This application is a continuation-in-part of copending U.S. Pat. application Ser. No. 763,972, filed Sept. 30, 1968, now abandoned.

BACKGROUND OF THE INVENTION

Multilayer coating systems are well known in the coating industry. However, in order to prepare these systems it has previously been required that each coat be baked or cured before a second or topcoat is applied. Thus several time consuming baking or curing steps are normally required where multilayer coating systems are applied. Furthermore when multilayer coating systems have previously been applied, it has been difficult to obtain coatings having uniformly high gloss.

In the automotive industry two significant systems are utilized in the painting of automobiles. One topcoat system which utilizes thermoplastic resins is known as the acrylic lacquer system. In this system the base polymers are the homopolymers of methyl methacrylate and copolymers of methyl methacrylate and acrylic acid, methacrylic acid, alkyl esters of acrylic acid or methacrylic acid, vinyl acetate, acrylonitrile, styrene and the like. The acrylic lacquer topcoats have been acknowledged to have outstanding esthetic properties but have poor chemical resistance and poor cracking and crazing resistance, among other disadvantages. The other topcoat system used in the automotive industry is the thermosetting acrylic resins as described in U.S. Pat. No. 3,375,227, issued Mar. 26, 1968. This other topcoat system has outstanding chemical resistance and outstanding resistance to cracking and crazing, among other outstanding properties, but to the expert paint formulator, the thermosetting acrylic resins do not quite provide the esthetic properties obtained in the acrylic lacquer systems.

SUMMARY OF THE INVENTION

This invention relates to an improved multilayer coating composition and to the process for producing same. More particularly, the invention is directed to curable, and cured multicoat film compositions produced by depositing a nonaqueous, pigmented, cellulose ester containing polymer base film on a substrate, preferably metal, and, before baking, depositing (wet-on-wet) a transparent composition onto the base film. Utilizing this process offers a means of obtaining coatings having improved esthetic properties and a means for combining the desirable properties of two different types of films. Moreover this invention provides novel coatings for substrata which on curing not only provide outstanding esthetic and gloss properties but also offers a means of reducing the time required to apply a two-coat system. Previously known two-coat systems required two baking cycles—one for the base coat and one for the topcoat. According to the methods herein disclosed a two-coat system can be prepared which requires only one baking cycle.

The curable multicoat films of this invention are prepared by depositing on a substrate a nonaqueous base film produced from a composition comprising an acrylic, alkyd polyurethane, or polyester film-forming polymer containing from about 2 to about 50 weight percent of a cellulose ester based on the film-forming solids, uniformly dispersed pigment, volatile organic solvents and in some instances a polymer cross-linking agent. The preferred method of depositing the base film is by utilizing a spraying technique. Under these conditions, the thickness of the base film is controlled to provide the most rapid removal, especially under ambient conditions, of the volatile organic solvent. The presence of cellulose esters such as cellulose acetate butyrate also facilitates the quick release of the volatile organic solvents. After the base film has been formed and without utilization of a baking procedure, a coating composition is deposited onto the base film in amounts sufficient to cover the base film in the form of a transparent continuous film. The transparent film is deposited by a wet-on-wet technique onto the base film. The quick release of the solvents in the base film provides a film which will not substantially intermix or interdissolve with the transparent coating but yet allows the transparent coating to substantially wet the surface of the base film. After the transparent topcoat is applied, normally to obtain a dry film thickness in the range from 0.25 to 5 mils, preferably 0.6 to 1.3 mils, the films are heated to a temperature in the range from about 180° F. to about 400° F. for a period of time sufficient to cure or dry the coating. The transparent film is produced from a composition which comprises an acrylic, polyurethane alkyd or polyester film forming polymer. The term acrylic film forming polymer is meant to include both thermosetting and thermoplastic acrylic polymers including, acrylic solution and dispersion lacquers, solution and dispersion carboxy hydroxy acrylics and alkylated, alkylol acrylamide acrylics. In some instances a polymer cross-linking agent is also included therewith. The remaining portion of the transparent coating composition is a volatile solvent for the copolymer. Where a polymeric dispersion resin is used herein, the volatile organic solvent will not actually dissolve the dispersion polymer. In all other cases however, the film-forming polymer should be soluble in this solvent.

DESCRIPTION OF INVENTION

The multilayer coating compositions of this invention can be used, if desired, directly on a bare substrate, on a treated substrate, on a primed (i.e., for corrosion resistance) substrate and the like. Steel is the preferred substrate but other substrata can be used which are not adversely affected by baking operations including glass, ceramics, asbestos, wood and plastics (when moderate baking temperatures are permissible) and metals such as aluminum, copper, magnesium and alloys thereof as well as other metals.

Acrylic lacquers such as are described in U.S. Pat. No. 2,860,110, are one type of film-forming composition useful herein. The acrylic lacquer compositions include as the principal and essential film-forming constituent, the homopolymers of methyl methacrylate and copolymers of methyl methacrylate which contain among others, acrylic acid, methacrylic acid, alkyl esters of acrylic acid, alkyl esters of methacrylic acid, vinyl acetate, acrylonitrile, styrene and the like. The relative solution viscosity (R.S.V.) of the film-forming acrylic lacquer polymers when used in either the base coat or the transparent coat can range from about 1.05 to about 1.40. The relative solution viscosity of the polymer is defined as the quotient obtained by dividing the efflux time of a solution of 0.25 gram of the polymer in 50 ml. of ethylene dichloride by the efflux time of ethylene dichloride, the efflux times being measured in accordance with the procedure of A.S.T.M. D–445–46T, method B at 25° C. using a modified Ostwald viscometer, series 50.

When the R.S.V. of the acrylic lacquer polymer is less than about 1.05, the resulting films have poor solvent resistance, durability and mechanical properties. On the other hand when the R.S.V. is increased above the 1.40 level paints made from these resins are difficult to spray and have high-coalescing temperatures.

Another type of film-forming material useful in forming the transparent coating as well as the base coat of this invention is a combination of a cross-linking agent and a carboxy-hydroxy acrylic copolymer. Suitable carboxy-hydroxy acrylic copolymers are copolymers of 0.15 to 8 weight percent of a polymerizable monoethylenically unsaturated carboxylic acid, 5 to 75 weight percent of a beta-hydroxyalkyl ester of a polymerizable monoethylenically unsaturated carboxylic acid and another different monomer polymerizable therewith. This copolymer preferably should include:
1. 0.15 to 8 weight percent (more preferably 0.15 to 4 weight percent) of an unsaturated aliphatic acid selected from at least one member of the group consisting of acrylic acid, methacrylic acid, crotonic acid, itaconic acid, and half acid-esters of maleic and fumaric acids formed with saturated alcohols having from one to 10 carbon atoms.

2. 17 to 94.8 weight percent of at least one different ethylenically unsaturated monomer of the individual material selected in (1) which is copolymerizable with the unsaturated acid of (1)

3. 5 to 75 percent of a beta hydroxy alkyl ester of an unsaturated aliphatic acid selected from at least one member of the group consisting of acrylic acid, methacrylic acid, crotonic acid, and half acid-esters of maleic and fumaric acids formed with saturated alcohols having one to 10 carbon atoms, the total of (1) (2) and (3) being 100 percent.

Typical of the alpha beta unsaturated acids for use in the preparation of the copolymer are short chain alpha beta unsaturated aliphatic monocarboxylic acids such as acrylic acid, methacrylic acid and crotonic acid. By short chain alpha beta unsaturated acids are intended those of not more than 12 carbon atoms. Included are half esters of maleic and fumaric acids formed with saturated alcohols of from one to 10 carbon atoms.

The beta hydroxyalkyl esters of polymerizable acids include the beta hydroxyalkyl esters of the polymerizable acids described above. The preferred beta hydroxyalkyl esters are those which contain two to four carbon atoms in the alkyl group. Examples of these esters are beta hydroxyethyl acrylate, beta hydroxyethyl methacrylate, beta hydroxypropyl acrylate, beta hydroxypropyl methacrylate, beta hydroxybutyl crotonate, beta hydroxypropyl butyl maleate, beta hydroxypropyl ethyl fumarate and the like. Beta hydroxyalkyl esters can be made by reacting a monoepoxide compound with a polymerizable ethylenically unsaturated acid. Additional beta hydroxyalkyl esters useful in preparing the carboxy-hydroxy copolymers are made by reacting the polymerizable acids as hereinbefore described with such monoepoxides as ethylene oxide, 1,2-propylene oxide, 1,2-butylene oxide, 2,3-butylene oxide, styrene oxide, phenyl glycidyl ether, butyl glycidyl ether and the like.

Other monomers that can be copolymerized with the hydroxy and acid monomers are esters of acrylic and methacrylic acid with alkanols containing one to 12 carbon atoms, such as ethyl acrylate, methyl methacrylate, butyl acrylate, butyl methacrylate, 2-ethylhexyl acrylate, lauryl methacrylate, benzyl acrylate, cyclohexyl methacrylate, and the like. Additional monomers are acrylonitrile, methacrylonitrile, styrene, vinyl toluene, alpha-methyl styrene, vinyl acetate, and so forth. These monomers contain one polymerizable ethylenically unsaturated group and are devoid of hydroxyl and carboxylic acid groups.

The cross-linking agents used in combination with the hydroxy-carboxy copolymers are those compositions which are reactive with hydroxy and/or carboxylic acid groups. Examples of such cross-linking agents are polyisocyanates, polyepoxides and aminoplast resins. Particularly preferred cross-linking agents are the aminoplast resins.

Aminoplast resins, as contemplated herein, include alkylated condensates formed by the reaction of aminotriazines and aminodiazines with aldehydes. It is known that various amines and amides will condense in the presence of alcohols with aldehydes to form alkylated aldehyde-amine and aldehydeamide condensates. Thus, urea, thiourea, and various substituted ureas and urea derivatives will react with aldehydes such as formaldehyde to form alkylated condensates, e.g., methylol ureas, etc. Similarly, it is well known that melamines such as melamine itself and benzoguanamine will react with aldehydes, particularly formaldehyde, to form melamine-aldehyde condensates. Various other amines and amides can similarly be reacted with formaldehyde, etc., to form alkylated amine aldehyde or amide aldehyde resins or condensates. Alkylated condensates result when the aminoaldehyde or amide aldehyde resin is prepared in the presence of alcohols such as methyl, ethyl, propyl, butyl, isobutyl, octyl, and decyl alcohol, these solvents actually becoming a part of the resulting product. In general, alkylated urea or melamine aldehyde condensates of different degrees of condensation can be used so long as they are soluble in aromatic hydrocarbons or mixtures of these with other solvents. Alkylated melamine-aldehyde condensates, however, are the preferred aminoplast resins.

The proportions of the carboxy containing hydroxyl copolymer and the cross-linking agent such as the aminoplast resin will depend on the desired properties of the finished coating which results on curing from 180° to 400° F. It is usually preferred that the polymer composition contain 5 to 50 weight percent of cross-linking agent and more preferably 20 to 40 weight percent, based on the weight of the film-forming material.

Among the other base coats which are useful according to the processes of this invention are those commonly known as alkyd resins which are defined to include fatty acid or oil containing esterification products. The methods for preparing these resins are well known in the art. In general two basic methods are used. In the first a fatty acid is reacted with a mixture of polyols and polybasic acids such as glycerine and phthalic anhydride. The second method commonly used entails the alcoholysis of a fatty oil such as cocoanut oil with a polyol such as pentaerythritol and then the further condensation of this reaction product with polyols and polybasic acids as above.

The preferred alkyd resins useful in this invention are those containing from about 5 to about 65 weight percent of a fatty acid or oil and having an hydroxyl equivalent to carboxy equivalent ratio of from about 1.05 to 1.75. Alkyd resins having less than about 5 percent fatty compound are classified as the "oil-less" alkyd resins or polyester resins described hereinafter. On the other hand alkyd resins containing greater than 65 percent of a fatty compound exhibit poor baking properties, poor chemical resistance and unsatisfactory adhesion to either the base coat or the substrate. When the hydroxyl to carboxyl equivalent ratio is less than about 1.05 gelation can result during polymer preparation while resins prepared having a ratio in excess of 1.75 have low molecular weights and therefore poor chemical resistance.

These alkyd resins can also be used as the topcoat of this invention. When this is the case it is preferred that the oil or fatty acid portion of the alkyd resin contain a light colored baking oil or fatty acid such as cocoanut or dehydrated castor oils or fatty acids. Furthermore when these resins are used as topcoats they can be reacted with various acrylic or ethylenically unsaturated monomers as described above to produce vinyl modified alkyd resins.

Curing of these alkyd resins can be accomplished by blending with any of the previously described cross-linking agents in the same weight ratios as are used with carboxy-hydroxy copolymers.

Included among the various fatty acids and oils useful in preparing these alkyd resins are the fatty acids derived from the following oils; castor, dehydrated castor, cocoanut, corn, cottonseed, linseed, oticica, perilla, poppyseed, safflower, soybean, tung oil, etc., and the various rosins containing tall oil fatty acids. Useful polyols include the various glycols, such as ethylene glycol, propylene glycol, neopentyl glycol, butylene glycol, 1,4 butanediol, hexylene glycol, 1,6 hexanediol, the polyglycols such as diethylene glycol or triethylene glycol, etc.; the triols such as glycerine, trimethylol ethane, tirmethylol propane, etc., and other higher functional alcohols such as pentaerythritol, sorbitol, mannitol, and the like. Acids useful in preparing the alkyd resins of this invention include monofunctional acids such as rosin acids, benzoic acid, para tertiary butyl benzoic acid and the like; the polyfunctional acids such as, adipic acid, azelaic acid, sebacic acid, phthalic acid or anhydride, isophthalic acid, terephthalic acid, dimerized and polymerized fatty acids, trimellitic acid, and the like.

Yet another useful base or topcoat is prepared using nonaqueous dispersions such as are described in U.S. Pat.

Nos. 3,050,412, 3,198,759, 3,232,903, 3,255,135. Typically these dispersions are prepared by polymerizing a monomer such as methyl methacrylate in the presence of a solvent in which polymers derived from the above monomer are insoluble and a precursor which is soluble in the solvent. Nonaqueous dispersions can have a relative solution viscosity (R.S.V) as previously defined of about 1.05 to 3.0. Dispersions having a R.S.V. in excess of about 3.0 are difficult to spray and have high coalescence temperatures while dispersions with an R.S.V. less than about 1.05, have poor resistance, durability and mechanical properties. The monomers useful in preparing the above dispersed copolymers or homopolymers are those listed previously as useful in forming the carboxy-hydroxy acrylic copolymers.

In another instance the base coat film is produced from resins known as polyesters or "oil-less" alkyd resins. These resins are prepared by condensing nonfatty containing polyols and polyacids. Included among the useful polyacids are isophthalic acid, phthalic acid or anhydride, terephthalic acid, maleic acid or anhydride, fumaric acid, oxalic acid, sebacic acid, azelaic acid, adipic acid, etc. Monobasic acids such as benzoic, para tertiary butyl benzoic and the like can also be utilized. Among the poly alcohols are the diols or glycols such as propylene glycol, ethylene glycol, butylene glycol, 1,4-butanediol, neopentyl glycol, hexylene glycol, 1,6-hexanediol, and the like; the triols such as trimethylol ethane, trimethylol propane and glycerine and various other higher functional alcohols such as pentaerithritol.

The preferred type of polyester resin comprises the reaction product of aromatic and aliphatic mono and dibasic acids with a mixture of diols and higher functional alcohols. In order to obtain the optimum cure properties and molecular weight it is desirable for the ratio of the equivalents of hydroxyl in the alcohol reactants to the equivalents of acid in the acid reactants to be from about 1.1:1 to 1.75:1. Polyester resins having hydroxy to carboxyl equivalents ratios of less than about 1.1 generally gel before preparation is complete while those having ratios in excess of 1.75 are too low in molecular weight to have acceptable chemical resistance properties.

As with the alkyd resins the polyester resins prepared in this manner can be blended with any of the previously described cross-linking agents and cured by normal methods.

Additional resins useful in preparing the base coat films of this invention include those commonly referred to as alkylol acrylamide or methacrylamide resins. These resins can be prepared according to the methods described in U.S. Pat. Nos. 2,870,117, 2,840,945, 2,987,437 and 3,037,963. Generally these resins are prepared by copolymerizing any of the previously described acrylic or vinyl monomers with acrylamide or methacrylamide. When this polymerization is completed the acrylamide containing copolymer is then reacted through its pendant amide groups with an aldehyde such as formaldehyde and then further reacted with an alcohol, such as butanol.

Normally these acrylamide or methacrylamide acrylic resins should have the same R.S.V. range as do the previously described carboxy-hydroxy acrylic resins. In the preferred system the only other functional monomer present is from about 0.25 to 5.0 weight percent of an acid functional monomer. The resins prepared in this manner can then be used alone or blended with the previous described carboxy-hydroxy acrylic resins, applied to the particular substrate and cured. In a variation of this process these alkylated alkylol acrylamide or methacrylamide copolymers can be blended with both a carboxy-hydroxy acrylic resin and a cross-linking agent.

These alkylated alkylol acrylamide resins can in the same manner be applied as a topcoat resin over any of the other resin systems herein described.

Various urethane polymers can also be used in forming the base coat or transparent topcoat of this invention. These polymers can be prepared by several well-known methods. In one, a polyol or hydroxy-containing material such as the polyester resin, or hydroxy-containing acrylic resins as described above are cured by reaction with a diisocyanate containing material such as toluene diisocyanate. In another method a hydroxy-containing material such as a polyol, polyester resin or hydroxy acrylic resin is prereacted with an isocyanate and then this material is further cured by baking.

Utilizing the process of this invention offers a means of combining the desirable properties of a combination of resin systems. For example, in automotive finishes the pigment control properties of acrylic lacquers can be combined with the chemical resistance properties of thermosetting acrylic resins by applying a thermosetting acrylic clear coat over a thermoplastic acrylic lacquer base coat. Likewise in appliance finishes the chemical resistance of polyester resins can be combined with the lower cost of thermosetting acrylic resins by applying a polyester clear topcoat over a pigmented thermosetting acrylic base coat.

In all instances where the above methods and compositions are used extremely high-gloss films result. In fact where with normal two coat system a 60° gloss in excess of 90–95 is difficult to obtain, using the process of this invention gloss readings in excess of 100 are readily obtained.

The term "transparent film" is defined as a film through which the base film can be seen. It is preferred that the transparent film be substantially colorless so that the full polychromatic and esthetic effects of the base film are not substantially decreased. However, in some instances, desirable and unique styling effects can be obtained by the addition of contrasting or complementary colors to the transparent film. The outstanding feature of the transparent film is the significant improvement in the durability which is provided to the overall coating composition. The use of the transparent film which covers the pigments in the base film also provides the stylist with the opportunity to utilize pigments, heretofore considered unsatisfactory because of their poor durability properties, to provide different, pleasing and durable colors.

A distinct advantage of this invention especially where a thermosetting carboxy-hydroxy acrylic is applied over a base coat of a thermosetting acrylic or an acrylic lacquer is the control of pigment dispersion and orientation in the film when sprayed. Pigment control is evidenced by the "standard metallic appearance" which is the striking appearance of depth when the angle of incidence varies over curved surfaces. In this invention the pigments which are in the base coat and particularly metallic flakes, such as aluminum flakes, remain properly orientated and dispersed in the film as the film is applied, when the base film is overcoated with the transparent topcoat and during the baking operation. In some instances improvements in this orientation and dispersion are obtained during the baking operation, i.e., the appearance of depth in the baked film is better than that in the wet film. As stated above, pigment control is retained in the base coat while it is being overcoated. This is evidenced by lack of "strike-in" or migration of the two films (the base coat and topcoat) into each other. When "strike-in" occurs, pigments move from the base coat into the topcoat, the film compositions become intermixed at the interface and the baked coating composition has a dusty appearance rather than a clear "depth" appearance. By this invention substantially no "strike-in" occurs, and the coatings have outstanding clarity and depth. However, sufficient wetting takes place at the interface so that no problems of delamination and solvent release from either coating are obtained.

The cellulose esters which are used in the base film include cellulose nitrate, cellulose propionate, cellulose butyrate, cellulose acetate butyrate, cellulose acetate propionate, mixtures thereof among others. The preferred cellulose ester is cellulose acetate butyrate. The amount of cellulose ester can range from about 2 to about 50 weight percent, preferably about 5 to about 20 weight percent based on the film forming solids. The viscosity of the cellulose esters can range from about 0.1 to about 2 seconds. It is essential that the cellulose esters which are used be compatible with the particular resin used in the base coat. For this reason care must be taken in selecting both the particular cellulose ester and the base coat which is to be applied.

The pigments which are used in the base film include metallic pigments such as aluminum, copper, bronze and the like, as well as iron blues, organic reds, maroons, silica, talc, china clay and metallic oxides, silicates, chromates, sulfides, silicates, and the like. The pigments are used in proportions used in coating compositions to obtain the proper hiding. In the base film sufficient pigments are used to sufficiently hide at dry film thickness as low as 0.25 mils to as high as 3 mils preferably in the range from about 0.6 to about 1.5 mils. The shapes of the pigments can vary from irregular geometric figures to regular figures FIGURES depending on the desired result. The sizes of the pigments can vary from 44 microns down to 5 microns generally in the range from 5 to 20 microns.

Examples of the volatile solvents and diluents which can be used in formulating the coating compositions of the invention are toluene, xylene, butyl acetate, acetone, methyl isobutyl ketone, butyl alcohol, and other aliphatic, cycloaliphatic and aromatic hydrocarbons, esters, ethers, ketones, and alcohols such as are conventionally used in coating compositions. The criteria of the selection of the solvent is that it will not react with the film-forming material, can readily be removed in the application and curing process among other desirable properties. The amount of solvent is controlled to provide the coating composition with the ability of the coating to flow or level out to a smooth surface to provide an acceptable application.

The coating compositions of this invention can be applied to various substrata by brushing, spraying, dipping, flow coating, and the like. It is preferred, however, that the technique of spraying of these compositions onto a metal be utilized in view of the outstanding physical features of the coating which are obtained. Various types of spraying can be utilized such as compressed air spraying, electrostatic spraying, hot-spraying techniques, airless spraying, and the like. These processes can include hand or machine spraying.

When the base coat has been applied by any of the above methods it is preferably allowed to flash at ambient temperature for from about 30 seconds to 10 minutes. The top coat is then applied, the entire system flashed again and then baked at a temperature in the range from about 180° F. to about 400° F., preferably from about 225° F. to about 280° F.

The following examples are illustrative of the principles and practice of this invention although not limited thereto. Parts and percentages where used are parts and percentages by weight.

EXAMPLE A

To a suitable reactor equipped with a thermometer, stirrer, reflux condenser and dropping funnel were added 166 parts of n-butanol, 287 parts of toluene and 1,507 parts of ethylene glycol monoethyl ether acetate. To the dropping funnel was added a solution of 868 parts of n-butyl methacrylate, 812 parts of methyl methacrylate, 32.8 parts of methacrylic acid, 287.2 parts of hydroxypropyl methacrylate and 40 parts of cumene hydroperoxide. Heat and agitation were applied to the reactor and when the temperature of the solvents reached 277° F., the monomer-catalyst solution was added over a 45 minute period while holding the temperature between 262° F. and 277° F. After 2 hours' additional heating the temperature was 277° F. and the Gardner-Holdt viscosity at 25° C. of a check cut of the solution reduced to 30 percent solids with ethylene glycol monoethyl ether acetate was K-L. With 2 hours additional heating at 277° to 278° F. the viscosity was P-Q as determined by the check cut at 30 percent solids. Continued heating for 2 hours and 5 minutes raised the viscosity to Q-R. Heating was discontinued and the polymer solution was filtered. The resulting solution had a Gardner-Holdt viscosity of $Z_3$–$Z_4$ at 25° C. and at 39.9 solids in the polymerization solvents (84.91 percent ethylene glycol monoethyl ether acetate, 5.53 percent n-butanol and 9.56 percent toluene), weight/gallon of 8.42 pounds, acid value on solids basis of 17.2, and Gardner color of 1. The relative solution viscosity of the copolymer was 1.1434.

EXAMPLE B

Using the same procedure as was described in example A, 938 parts of n-butyl methacrylate, 878.4 parts of methyl methacrylate, 39.4 parts of methacrylic acid and 144.2 parts of hydroxypropyl methacrylate were polymerized in a mixture of 166 parts of n-butanol, 287 parts of toluene and 835 parts of ethylene glycol monoethyl ether acetate using 45 parts of cumene hydroperoxide as polymerization catalyst. The resulting copolymer solution at 40 percent nonvolatiles had a weight per gallon of 8.4 pounds, an acid value of 21.2 on solids basis, a Gardner color of less than 1 and a Gardner-Holdt viscosity at 25° C. of $Z_4$–$Z_5$. The relative solution viscosity of the copolymer was 1.1778.

EXAMPLE C

Using the same procedure as was described in example A, 938 parts of n-butyl methacrylate, 878.4 parts of methyl methacrylate, 39.4 parts of methacrylic acid and 144.2 parts of hydroxypropyl methacrylate were polymerized in 166 parts of n-butanol, 287 parts of toluene and 1,507 parts of ethylene glycol monoethyl ether acetate using 120 parts of cumene hydroperoxide as catalyst. The resulting copolymer solution when adjusted to 39 percent nonvolatiles had a weight per gallon of 8.27 pounds, an acid value on solids basis of 18.4, a Gardner color of less than 1, and a Gardner-Holdt viscosity at 25° C. of T–U. The relative solution viscosity of the copolymer was 1.0779.

EXAMPLE D

Using the procedure described in example A, 20 parts of butyl methacrylate, 30 parts of styrene, 20.3 parts of hydroxypropyl methacrylate, 1.7 parts of methacrylic acid and 28 parts of butyl acrylate were copolymerized in 85 parts of xylene and 15 parts of n-butanol using 4 parts of cumene hydroperoxide. The resulting copolymer solution at 40 percent nonvolatiles in xylene and butanol had a Gardner-Holdt viscosity of G–H and an acid value on solids basis of 14 to 16.

EXAMPLE E

Using the procedure described in example A, a copolymer of 47 parts of butyl methacrylate, 37 parts of styrene, 15.75 parts of hydroxypropyl methacrylate and 0.25 part of methacrylic acid was prepared. At 45 percent nonvolatiles in xylene and butanol at a weight ratio of 85/15, the Gardner-Holdt viscosity at 25° C. was P–Q. The acid value on a solids basis was 10.

EXAMPLE F

Using the same procedure as in example A, a copolymer containing 33.30 weight percent styrene, 41.82 weight percent ethyl acrylate, and 49.76 weight percent hydroxypropyl methacrylate was prepared. At 55 percent solids in a mixture of 69.6 weight percent of a high-flash aromatic hydrocarbon solvent and 30.4 percent of xylene this polymer exhibited a Gardner-Holdt viscosity (25° C.) of $Z_1$, a Gardner color of 2, a solids acid value of 12 and a weight per gallon of 8.37 lbs.

EXAMPLE G

Using the same procedure as in example A a copolymer containing 0.57 weight percent methacrylic acid, 32.36 weight percent hydroxy propyl methacrylate, 34.00 percent styrene, and 49.25 weight percent methyl methacrylate was prepared. When reduced to 50 percent solids in 18.2 weight percent butanol and 81.8 weight percent xylene this polymer exhibited a Gardner color of 2, an acid value of 13, a Gardner-Holdt 25° C. viscosity of W–X, and a weight per gallon of 8.20 lbs.

EXAMPLE H

Using the same procedure as in example A, a copolymer containing 667 parts of styrene, 1,904 parts of ethyl acrylate, 199 parts of acrylamide and 10.6 parts of methacrylic acid was prepared. This copolymer was then reacted with 420 parts of formaldehyde, and 841 parts of butanol to produce a polymer which when reduced to 50 weight percent solids in 33.3 percent butanol, 66.7 percent high-solvency hydrocarbon solvent exhibited a Gardner-Holdt 25° C. viscosity of X, a Gardner color of 4, a solids acid value of 3 and a weight per gallon of 8.19 lbs.

EXAMPLE I

Using a reaction vessel equipped with a mechanical agitator, temperature sensors, packed distillation column and a water receiving well, a polyester resin was prepared by reacting 2,447 parts of isophthalic acid, 1,436 parts of adipic acid, 1,685 parts of neopentyl glycol and 1,316 parts of trimethylol propane. When reduced to 60 percent solids in 10 percent butyl Cellusolve and 90 percent xylene the resulting polymer solution exhibited a Gardner-Holdt (25° C.) viscosity of Y, a Gardner color of 2, a solids acid value of 20 and a weight per gallon of 8.70.

EXAMPLE J

Using a reaction vessel equipped with a mechanical agitator, temperature sensors and water distillation side arm, an alkyd resin was prepared by alcoholizing 2,737 parts of cocoanut oil with 1,009 parts of glycerine. This alcoholysis product was then reacted with 3,518 parts of phthalic anhydride, 120 parts of maleic anhydride and 1,087 parts of glycerine. When reduced to 60 percent solids in 71.3 weight percent xylene, 23.7 percent high-solvency aromatic hydrocarbon solvent and 5.0 weight percent butanol, this alkyd resin polymer exhibited a Gardner-Holdt 25° C. viscosity of X–Y, a color of 3, a solids acid value of 5 and a weight per gallon of 8.60 lbs.

EXAMPLE 1

A pigment base was prepared by blending 11.76 parts of aluminum pigment paste, 0.26 part of low-opacity yellow iron oxide pigment paste, 0.56 part of carbon black pigment paste and 1.70 parts of phthalocyanine blue pigment paste. The aluminum pigment paste was made by mixing 30.78 parts of aluminum pigment made from 65 weight percent aluminum flakes coated with stearic acid and dispersed in mineral spirits, 14.22 parts of xylene and 55 parts of a butylated methylol melamine resin solution at 60 percent nonvolatiles in xylene and butanol, having a Gardner-Holdt viscosity at 25° C. of O–R, an acid value of 0.2–1.0 and a naptha tolerance of 200–350.

The iron oxide pigment paste was prepared from a sand grind of 30.25 parts of low-opacity yellow iron oxide, 52.40 parts of the copolymer solution of example D at 45 percent nonvolatiles and 17.35 parts of an aliphatic hydrocarbon solvent.

The carbon black pigment paste was made from a sand grind of 27.60 parts of the butylated methylol melamine resin solution previously described, 15.78 parts of butanol and 5.91 parts of carbon black.

The phthalocyanine blue pigment paste was prepared by sand grinding 74.67 parts of the butylated methylol melamine resin solution previously described with 10.13 parts of phthalocyanine blue and 15.2 parts of an aliphatic hydrocarbon solvent.

The above described pigment base (14.28 parts) was blended with 1.52 parts of the butylated methylol melamine resin described above, 9.75 parts of acetone and 3.24 parts of cellulose acetate butyrate having a viscosity of 1–2 seconds (ASTM Method D–1343–54T) a butyryl content of 50 percent, an acetyl content of 2.8 percent and a hydroxyl content of 2.0 percent dissolved in 4.86 parts of acetone, 5.67 parts of toluene and 3.24 parts of ethylene glycol monoethyl acetate. After thorough mixing the resulting base coat paint was reduced to 14 seconds viscosity as determined by a No. 4 Ford cup with about 100 parts of toluene.

The thermosetting acrylic copolymer solution described in example A at 45 percent nonvolatiles, a total of 144 parts, was blended with 58 parts of the butylated methylol melamine resin solution (60 percent nonvolatiles) previously described. The resulting blend was reduced to 40 percent nonvolatiles with xylene, producing a transparent coating composition having a viscosity of 28–32 seconds as measured by a No. 4 Ford cup. Pine oil, 5 parts, and about 50 parts of xylene were then added, reducing the viscosity to 17 seconds.

Bonderized steel panels primed with a cured corrosion resistant primer were sprayed with the base coating composition to a film thickness of 0.5 mil on dry film basis. After a flash of approximately 2 minutes at room temperature, an additional 0.5 mil film of the base coat again as measured on a dry film basis was applied by spraying. After a 2 minute flash at room temperature, the transparent top coating described above was applied by spraying to a film thickness on dry basis of 1 mil. After a 2–5 minute flash period at room temperature the coated panel was baked at 250° F. for 30 minutes. The resulting coating, having a silver metallic appearance, had excellent gloss as evidenced by a reflectance of 80–95 percent on a 20° Gardner glossmeter. The coating exhibited excellent polychromatic properties with uniformity of the aluminum particle orientation. The coating had excellent acid resistance. A spot of 5 percent sulfuric acid when evaporated to dryness did not mar the film. The outdoor exposure durability was excellent with little dulling after 18 months exposure.

EXAMPLE 2

According to the procedure described in example 1, silver metallic base coating compositions were prepared using the same components in the same proportions as were described in example 1 except the copolymer solutions described in example B and in example C were substituted for the copolymer solution of example 1. When these base coats were sprayed on primed bonderized steel panels in the manner described in example 1, were top coated with the transparent coating composition of example 1 in the same way as example 1 and were baked for 30 minutes at 250° F., excellent coatings with outstanding durability and esthetic appearance were obtained.

EXAMPLE 3

To a suitable container equipped with a mechanical agitator were added the following components:

54.05 parts of a 40 percent nonvolatile solution of an acrylic copolymer made from 97 percent methyl methacrylate and 3 percent methacrylic acid dissolved in a solvent mixture of 92 percent toluene and 8 percent acetone. The copolymer solution had a Gardner-Holdt viscosity of $Z_3$–$Z_4$ and an acid value of 19.9 on solids basis. The acrylic copolymer had a relative solution viscosity of 1.1172;

24.48 parts of a 20 percent nonvolatile solution of cellulose acetate butyrate in a solvent mixture of 37.5 percent acetone, 43.75 percent toluene and 18.75 percent ethylene glycol monoethyl ether acetate. The cellulose acetate butyrate had a butyryl content of 37 percent, an acetyl content of 13, a hydroxyl content of 2 percent and a viscosity of 2 seconds as determined by ASTM Method D–1343–54T;

6.85 parts of butyl benzyl phthalate plasticizer;

6.28 parts of a dispersion of 20 percent medium size aluminum flakes, 11 percent butyl benzyl phthalate, 7 percent cellulose acetate butyrate as described above, 31 percent ethylene glycol monoethyl ether acetate and 31 percent toluene;

0.72 part of a dispersion of 13 percent phthalocyanine blue pigment, 17.5 percent butyl benzyl phthalate, 7.5 percent cellulose acetate butyrate 31 percent ethylene glycol monoethyl ether acetate and 31 percent toluene;

0.14 part of a dispersion of 45 percent titanium dioxide, 6 percent cellulose acetate butyrate, 24.5 percent ethylene glycol monoethyl ether acetate and 24.5 percent toluene;

0.1 part of a dispersion of 18 percent organic red pigment, 17.5 percent butyl benzyl phthalate, 7.5 percent cellulose acetate butyrate, 28.5 percent ethylene glycol monoethyl ether acetate and 28.5 percent toluene; and 8.71 parts of acetone.

These components were thoroughly blended to make a pigmented acrylic base coat.

Primed bonderized steel panels were sprayed with the base coat composition to a film thickness of 0.5 mil on dry film basis. After a flash time of 2 minutes at room temperature an additional 0.5 mil, on dry film basis, of the base coat was applied by spraying. Allowing 2 to 5 minutes flash time at room temperature, the transparent top coat described in example 1 was applied by spraying to a dry film thickness of 1 mil. After baking for 30 minutes at 250° F., light blue metallic coatings having excellent gloss and outstanding esthetic and durability properties were obtained.

EXAMPLE 4

A transparent top-coating composition was prepared by blending 144 parts of the copolymer solution described in example E at 45 percent nonvolatiles with 58 parts of the 60 percent nonvolatile solution of butylated methylol melamine described in example 1. This top-coating composition was applied by spraying to a dry film thickness of 1 mil over the base coat described in example 1 applied to a metal substrate as described in example 1. After a 2–5 minute flash time at room temperature, the coating was baked at 190° F. for 15 minutes. The coating was then sanded with 600 sand paper and water to smooth the coating and to remove surface imperfections. After rinsing with mineral spirits, the coating was baked at 250° F. for 30 minutes. The resulting coating had reflowed before curing, the sanding marks had disappeared and the coating also had a pleasing esthetic appearance, exhibiting superior polychromatic effects and aluminum control.

EXAMPLE 5 a. A white alkyd base coat was prepared by mixing 29.90 parts of rutile titanium dioxide, 7.50 parts of the alkyd resin prepared in example J and 7.50 parts of toluene. This mixture was ground on a pebble mill for 18 hours and 30.00 additional parts of the resin prepared in example J; 4.91 parts of toluene; 9.39 parts of a butylated melamine formaldehyde resin having a solids content of 57.5 percent in a solution of 50 percent butanol and 50 percent xylene, a Gardner-Holdt viscosity of E–F an acid value of 1.0, a weight per gallon of 8.40 lbs., a pH of 7.4 and a naphtha tolerance of 700, and 10.50 parts of a 30 percent solution of cellulose acetate butylate were added thereto.

b. A clear polyester topcoat was prepared by mixing 43.67 parts of the polyester resin prepared in example I; 7.33 parts of butylated melamine formaldehyde resin having a solids content of 60 percent in a solution of 50 percent butanol and 50 percent xylene, a Gardner-Holdt viscosity (25° C.) of G–H, an acid value of 1.4, a weight per gallon of 8.50 and a naphtha tolerance of 200; 4.40 parts of Cymel 301, a hexamethoxy methyl melamine resin prepared by American Cyanamide Co., and furnished at about 100 percent solids, at a Gardner-Holdt viscosity of Y and a weight per gallon of 10.1 lbs.; 6.67 parts of a solution of a polyglycidyl ether of Bisphenol A having an epoxide equivalent weight of 510 dissolved to 60 percent solids in a mixture of 50 percent diacetone alcohol, 25 percent butyl Cellosolve, and 25 percent of a high flash aromatic hydrocarbon solvent; 6.45 parts of a 15 percent cellulose acetate butyrate solution; 0.25 parts of a 25 percent solution of para toluene sulfonic acid; 4.00 parts of butyl Cellosolve; 4.00 parts of butanol; 4.00 parts of methyl isobutyl ketone and 18.46 parts of xylene.

The base coat prepared in example 5a was applied to a metal panel by spraying and flashed at room temperature for 3 minutes. The topcoat of example 5b was applied to this base coat to a dry film thickness of about 0.5 ml., flashed for 7 minutes and baked for 30 minutes at 325° F. Evaluations of the baked panel indicated at 60° gloss of 100+, a pencil hardness of H–2H and excellent flexibility and chemical resistance properties.

EXAMPLE 6

A white acrylic-butylated methylol acrylamide base coat was prepared by blending 27.95 parts of rutile titanium dioxide with 4.50 parts of the acrylic resin prepared in example F, 3.00 parts of toluene and 2.00 parts of xylene. This blend was ground on a pebble mill for 18 hours, 4.00 additional parts of example F were added and this blend was ground on a pebble mill for 2 more hours. To the resulting tint paste were added 15.94 parts of example F; 2.00 parts of methyl ethyl ketone; 10.27 parts of the melamine resin described in example 1; 6.72 parts of the butylated methylol acrylamide copolymer described in example H; 467 parts of the epoxy resin described in example 5b; 11.20 parts of a 20 percent cellulose acetate butyrate solution; 4.70 parts of methyl isobutyl ketone and 2.00 parts of toluene.

The white base coat resin as prepared above was sprayed onto a steel panel and flashed at room temperature for 3 minutes. A polyester topcoat prepared according to the methods of example 5b was then applied to a dry film thickness of 0.75 mil, flashed at room temperature for 10 minutes and baked for 20 minutes at 340° F. A multicoat finish resulted having excellent flexibility and stain resistance, a 60° gloss of 100+ and a pencil hardness of 2H–3H.

EXAMPLE 7

An avacado colored base coat was prepared by blending 15.61 parts of rutile titanium dioxide, 2.64 parts of light chrome yellow pigment, 0.12 part of yellow iron oxide, 0.08 parts of lampblack, 4.50 parts of the acrylic resin prepared in example F, 4.50 parts of toluene and 1.50 parts of xylene. This blend was ground on a steel ball mill for 18 hours, 4.00 additional parts of example F were added and the resulting tint paste was ground on the steel ball mill for another 2 hours. To the resulting paste were added 2.00 parts of methyl ethyl ketone; 19.86 parts of example F; 11.92 parts of the melamine resin described in example 1; 7.80 parts of the butylated methylol acrylamide polymer described in example H; 5.42 parts of the epoxy resin described in example 5b; 13.00 parts of a 20 percent solution of cellulose acetate butyrate; 5.00 parts of methyl isobutyl ketone and 2.00 parts of toluene.

The avacado colored base coat prepared as above was sprayed onto steel panels, flashed and top coated as in example 6. An excellent coating resulted having a pencil hardness of 2H–3H and a 60° gloss of 100+.

EXAMPLE 8

Using the same procedure as in example 6, a white base coat was prepared having the same components as the base coat described in example 6 except that no cellulose acetate butyrate was added. This base coat was sprayed onto a steel panel flashed for 3 minutes and the polyester top coat of example 5b was applied. The total system was then flashed for 10 minutes and baked for 20 minutes at 340° F.

The resulting multicoat system exhibited extreme "strike in," its gloss was extremely poor and the topcoat had a salty or gritty appearance.

EXAMPLE 9

An acrylic topcoat system was prepared by blending 54.40 parts of the resin prepared in example G, 18.00 parts of the melamine resin described in example 1, 2.00 parts of di(2-ethyl hexyl) isophthalate; 15.00 parts of xylene, 5.00 parts of a high-solvency aromatic hydrocarbon solvent, 3.00 parts of an aromatic hydrocarbon solvent and 2.00 parts of butanol.

Two steel panels were coated, one with the acrylic acrylamide base coat of example 6, and one with the alkyd base coat of example 5a. In each instance the base coat was flashed for 3 minutes at room temperature and the above acrylic topcoat was applied over both, flashed for 10 minutes at room temperature and baked for 20 minutes at 340° F. Both panels indicated at 60° gloss in excess of 100. The alkyd base coat system exhibited a pencil hardness of F–H while the pencil hardness of the acrylic-butylated methylol acrylamide base coat was 2H–3H.

EXAMPLE 10

A nonaqueous dispersion was prepared using the procedure described in U.S. Pat. No. 3,232,903. The dispersion was made at 50 percent solids in VM&P naphtha from a copolymer of 98 percent methyl methacrylate and 2 percent lauryl methacrylate. A transparent coating composition was prepared by blending 68.4 parts of the nonaqueous dispersion, 11.25 parts of di(2-methylcyclohexyl)phthalate, 3.75 parts of butyl 4-methylcyclohexyl phthalate, 3.5 parts of 2,2,4trimethyl-1,3-pentanediol monoisobutyrate and 13.1 parts VM&P naphtha.

Bonderized steel panels primed with a cured corrosion resistant primer were sprayed with the base coating composition described in example 1 using the procedure of example 1. These panels were then sprayed with the transparent coating described above at dry film thicknesses of 1.0, 1.6, and 2.5 mils respectively. After a 2 minute flash at room temperature, the panels were baked at 280° F. for 30 minutes. The dried, cured coatings had good gloss and appearance.

EXAMPLE 11

A transparent coating composition was prepared by blending (a) 100 parts of a polyester solution made from 45 parts of a low-molecular weight phthalic anhydride based polyester having an average equivalent weight of 225, a hydroxyl number of 230–270 and an acid value of less than 4, 25 parts of Cellulose acetate and 30 parts of methyl ethyl ketone, (b) 55 parts of a diisocyanate adduct at 75 percent solids in Cellosolve acetate and xylene (1:1), the adduct being the isocyanate terminated reaction product of hexamethylene diisocyanate and water prepared according to the methods disclosed in U.S. Pat. No. 3,124,605, the solution having an NCO content of about 15–16 and a viscosity of 20° C. of about 250 c.p.s.; and (c) 2 parts of a 10 percent solution in Cellosolve acetate of 0.1 second cellulose acetate butyrate. The resulting blend was reduced to 17 second Ford cup viscosity with a 1:1 mixture of toluene and butyl acetate. The resulting transparent coating was sprayed on panels coated with a base coat as described in example 10. After a 2 minute flash at room temperature, the panels were baked for 30 minutes at 250° F. The coatings had high gloss, and good appearance.

The multilayer systems as are disclosed herein are not limited to two coat systems. More than one coat can be used as either the base or topcoat. When base film or base coat and transparent film or topcoat are used herein they are read to include multiple base coat or multiple topcoat systems. For example to give a shading effect a light colored first base coat containing a cellulose ester can be applied to an article followed by a second different colored edge coat also containing a cellulose ester. Over the top of both these coats a clear topcoat can be applied and the entire three coat system baked at one time without "strike-in."

It is understood that the foregoing detailed description is given merely by way of illustration and they many variations can be made therein without departing from the spirit of this invention.

The embodiments of the invention in which an exclusive property or privilege is claimed are defined as follows:

1. An article having a substrate and a multilayer coating composition adhered thereto, which composition comprises:
   A. a dried nonaqueous base film produced from a composition comprising:
      1. a first film-forming material selected from the group consisting of alkyd resins, polyester resins, acrylic resins, and polyurethane resins, wherein said first film-forming material contains from about 2 to about 50 weight percent, based on the film-forming solids, of a cellulose ester,
      2. uniformly dispersed pigments, and
      3. volatile organic solvents for said first film-forming material, and
   B. a baked transparent coating composition deposited on said base film in a relationship to maintain substantially no intermixing and no intersolution of said base film and said transparent coating composition, said transparent coating composition comprising:
      1. a second film-forming material selected from the group consisting of alkyd resins, polyester resins, acrylic resins and polyurethane resins, and
      2. volatile organic solvents for said second film-forming material.

2. The article of claim 1 wherein the cellulose ester is cellulose acetate butyrate.

3. The article of claim 2 wherein said first film-forming material is a composition comprising:
   A. a cross-linking agent, and
   B. a copolymer of
      1. from about 0.15 to about 8 weight percent of at least one unsaturated aliphatic acid selected from the group consisting of acrylic acid, methacrylic acid, crotonic acid, and half acid esters of maleic and fumaric acids formed with saturated alcohols having from one to 10 carbon atoms,
      2. from about 17 to about 94.8 weight percent of at least one different ethylenically unsaturated monomer which is different from the unsaturated aliphatic acid selected in (1) and copolymerizable therewith, and
      3. from about 5 to about 75 weight percent of at least one beta hydroxy alkyl ester of an unsaturated aliphatic acid, which acid is selected from the group consisting of acrylic acid, methacrylic acid, itaconic acid, crotonic acid, and half acid esters of maleic and fumaric acids formed with saturated alcohols having from one to 10 carbon atoms, the total of (1), (2), and (3) being 100 weight percent.

4. The article of claim 3 wherein said cross-linking agent for said first film-forming material and said cross-linking agent for said second film-forming material independently are selected from the group consisting of aminoplast resins, diisocyanates, epoxy resins, and mixtures thereof.

5. The article of claim 3 wherein the predominant pigment is aluminum.

6. The article of claim 3 wherein the base film thickness ranges from 0.6 to 1.5 mils and the transparent coating composition thickness ranges from 0.6 to 1.3 mils.

7. The article of claim 1 wherein said first film-forming material is a mixture of an alkylated methylol amide acrylic resin, a thermosetting acrylic resin, and a cross-linking agent, and said second film-forming material is a mixture of a polyester resin and a cross-linking agent.

8. The article of claim 1 wherein said first film-forming material is an acrylic resin and said second film-forming material is (1) a cross-linking agent, and (2) a copolymer of
   A. from about 0.15 to about 8 weight percent of at least one unsaturated aliphatic acid selected from the group consisting of acrylic acid, itaconic acid, methacrylic acid, crotonic acid, and half acid esters of maleic and fumaric acids formed with saturated alcohols having from one to 10 carbon atoms,
   B. from about 17 to about 94.8 weight percent of at least one different ethylenically unsaturated monomer which is different from the unsaturated aliphatic acid selected in A and copolymerizable therewith, and
   C. from about 5 to about 75 weight percent of at least one beta hydroxy alkyl ester of an unsaturated aliphatic acid, which acid is selected from the group consisting of acrylic acid, methacrylic acid, itaconic acid, crotonic acid, and half acid esters of maleic and fumaric acids formed with saturated alcohols having from one to 10 carbon atoms, the total of A., B., and C. being 100 weight percent.

9. The article of claim 8 wherein said first film-forming material is a polymer of methyl methacrylate and wherein said cellulose ester is cellulose acetate butyrate having a viscosity of from about 0.1 to about 2.0 seconds and present in amounts ranging from about 5 to about 20 weight percent, based on the film-forming solids.

10. A process for producing a multilayer coating having outstanding esthetic properties and improved chemical resistance and durability properties, which comprises:
A. depositing on a substrate a nonaqueous base film produced from a composition comprising:
1. a first film-forming material selected from the group consisting of alkyd resins, polyester resins, acrylic resins, and polyurethane resins, wherein said first film-forming material contains from about 2 to about 50 weight percent, based on the film-forming solids, of a cellulose ester,
2. uniformly dispersed pigments, and
3. volatile organic solvents for said first film-forming material;
B. flashing said base film;
C. after said base film has been flashed without utilization of a baking procedure, depositing a coating composition onto said base film in amounts sufficient to cover said base film in the form of a continuous transparent film which will not substantially intermix with or interdissolve in said base, said coating composition comprising:
1. a second film-forming material selected from the group consisting of alkyd resins, polyester resins, acrylic resins, and polyurethane resins, and
2. volatile organic solvents for said second film-forming material; and
D. heating said multilayer coating at a temperature in the range of from 180° F. to 400° F. for a time sufficient to dry and cure the coating.

11. The process of claim 10 wherein the base coating is deposited at a dry film thickness of 0.25 to 3 mils and the transparent coating is deposited at a dry film thickness of 0.25 to 5 mils.

12. A process for producing a multilayer coating having outstanding esthetic properties, improved chemical resistance and improved durability properties which comprises:
A. depositing on a substrate a nonaqueous base film produced from a composition comprising:
1. acrylic polymer film formers containing from about 2 to about 50 weight percent of cellulose esters based on the film-forming solids,
2. uniformly dispersed pigments, and
3. volatile organic solvents for said film formers;
B. after the base film has been formed without utilization of a baking procedure, depositing a transparent coating composition onto said base film in amounts sufficient to cover said base film in the form of a transparent continuous film with substantially no intermixing or interdissolution in the base film, said transparent coating composition comprising:
1. a cross-linking agent,
2. a copolymer of
a. 0.15 to 8 weight percent of a polymerizable monoethylenically unsaturated carboxylic acid;
b. 5 to 75 weight percent of a beta-hydroxyalkyl ester of a polymerizable monoethylenically unsaturated carboxylic acid and
c. another different monomer copolymerizable therewith the total of (a), (b), and (c) being 100 percent, and
3. a volatile organic solvent; and
C. heating the multilayer coating at a temperature of 180° to 400° F. for a time sufficient to dry and cure the coating.

13. The process of claim 12 wherein the copolymer in the transparent coating is a copolymer of
A. from about 0.15 to about 8 weight percent of an unsaturated aliphatic acid selected from at least one member of the group consisting of acrylic acid, itaconic acid, methacrylic acid, crotonic acid, and half acid-esters of maleic and fumaric acids formed with saturated alcohols having one to 10 carbon atoms,
B. about 5 to about 75 percent by weight of a beta hydroxyalkyl ester of an unsaturated aliphatic acid selected from the group consisting of acrylic acid, methacrylic acid, crotonic acid and half acid-esters of maleic and fumaric acids formed with saturated alcohols having one to 10 carbon atoms, and
C. about 17 to about 94.8 percent by weight of at least one ethylenically unsaturated monomer which is different from the monomers of A. and B., the total of A., B. and C. being 100 percent.

14. The process of claim 13 wherein said acrylic polymer in the base film is the same as said transparent coating composition, sand said cellulose ester is cellulose acetate butyrate having a viscosity of from about 0.1 to about 2.0 seconds and is present in said base film in amounts ranging from about 5 to about 20 weight percent, based on the film-forming solids.

15. The process of claim 13 wherein said curing agent is an aminoplast resin.

* * * * *